J. KOEHN.
Wheel-Cultivator.
No. 65,918.
Patented June 18, 1867.
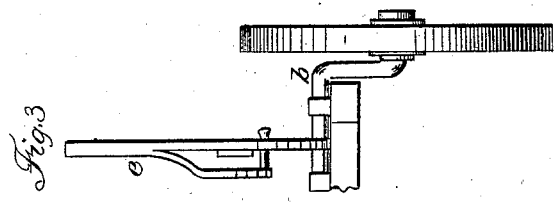
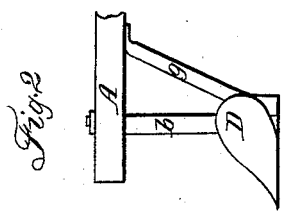
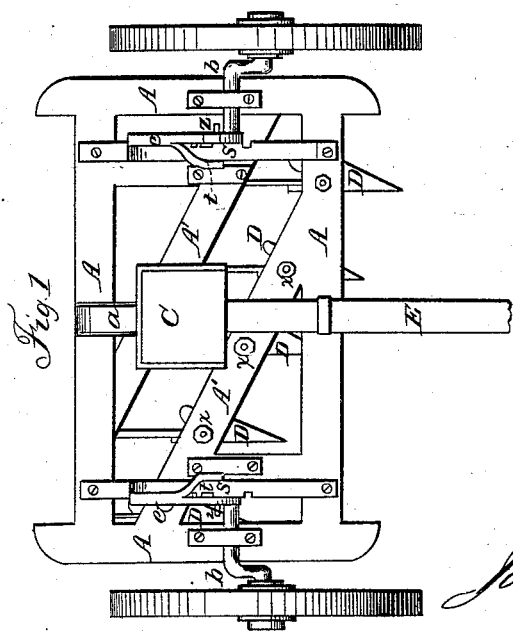

United States Patent Office.

JOSEPH KOEHN, OF CANTON, OHIO.

Letters Patent No. 65,918, dated June 18, 1867.

---

CULTIVATORS.

---

The Schedule referred to in these Letters Patent and making part of the same.

---

TO ALL WHOM IT MAY CONCERN:

Be it known that I, JOSEPH KOEHN, of Canton, in the county of Stark, and in the State of Ohio, have invented certain new and useful improvements in Cultivators; and do hereby declare that the following is a full, clear, and exact description thereof, reference being had to the accompanying drawings, and to the letters of reference marked thereon, making a part of this specification.

In the annexed drawings, A represents the frame, which is provided with a short axle, $b$ $b$, at each side, upon which are connected the wheels. The central portion or interior of the frame has two diagonal bars, A' A', to the under part of which are attached the shovels D D D. These diagonal bars answer the double purpose of firmly securing the main frame but stationarily hold the shovels. It will be observed that the shovels, when connected to the bars above described, will rest upon the earth in a diagonal line, and more effectually cultivate the ground than when set in a direct line. The shovels D are provided, each, with an upright bar, $f$, threaded at its top, which is passed up through the forward bar A', and there secured by a nut, $x$, while there is also a slanting bar extending from the shovel to the rear bar A' for staying the shovel. C represents the driver's seat, which is connected to the frame by means of a curved spring, $a$. The short axles $b$ $b$ rest upon the upper part of the frame, and are connected to an upright lever, $e$. S S represent two semicircular rack-bars, which are attached to the frame above the inner end of the axles, and by which means the depth of the insertion of the shovels is regulated. Secured to each lever $e$ is a small spring, $t$, which straddles the rack S, and connected again under the rack by a small pin, $z$, with a head. The levers have a small rib on their insides which catch into and hold the axle in its place.

Having thus fully described my invention, what I claim as new, and desire to secure by Letters Patent, is—

1. The frame A, with diagonal bars A' A' for connecting the shovels D D, when constructed in the manner and used for the purposes set forth.

2. The arrangement of the lever $e$, spring $t$, and pin $z$, in combination with the axle $b$ and rack S, for the purposes specified.

In testimony that I claim the foregoing I have hereunto set my hand this first day of April, 1867.

JOSEPH KOEHN.

Witnesses:
    JOSEPH J. LOTHAMER,
    A. PONTIUS.